(12) United States Patent
Frederiks

(10) Patent No.: US 11,370,609 B2
(45) Date of Patent: Jun. 28, 2022

(54) STORE FOR THE SINGLE-LOCATION STORAGE OF PARCELLED GOODS

(71) Applicant: NEDCON B.V., Doetinchem (NL)

(72) Inventor: Jan Willem Frederiks, Doetinchem (NL)

(73) Assignee: NEDCON B.V., Doetinchem (NL)

( * ) Notice: Subject to any disclaimer, the term of this patent is extended or adjusted under 35 U.S.C. 154(b) by 182 days.

(21) Appl. No.: 16/736,888

(22) Filed: Jan. 8, 2020

(65) Prior Publication Data

US 2020/0216261 A1 Jul. 9, 2020

(30) Foreign Application Priority Data

Jan. 9, 2019 (DE) ...................... 10 2019 100 420.9

(51) Int. Cl.
*B65G 1/04* (2006.01)

(52) U.S. Cl.
CPC .................... *B65G 1/0435* (2013.01)

(58) Field of Classification Search
CPC ........ B65G 1/0435; B65G 1/0414; B66F 9/07
See application file for complete search history.

(56) References Cited

U.S. PATENT DOCUMENTS

| | | | | |
|---|---|---|---|---|
| 3,738,506 A * | 6/1973 | Cornford | ............. | B65G 1/0435 244/114 R |
| 4,273,494 A * | 6/1981 | Swain | .................. | B65G 1/0414 414/284 |
| 5,562,062 A * | 10/1996 | Upmeyer | ............. | B65G 1/0414 114/72 |
| 2002/0018706 A1 * | 2/2002 | Young | .................. | B65G 1/0407 414/790 |
| 2003/0185656 A1 * | 10/2003 | Hansl | .................... | B65G 1/0435 414/277 |
| 2005/0095093 A1 * | 5/2005 | Hansl | ........................ | B66F 9/07 414/277 |
| 2009/0196720 A1 * | 8/2009 | Kostmann | ............ | B65G 1/0435 414/331.01 |
| 2010/0104405 A1 * | 4/2010 | Amada | ..................... | B66F 9/07 414/281 |
| 2013/0209203 A1 * | 8/2013 | Rafols | .................. | B65G 1/0407 414/666 |

(Continued)

FOREIGN PATENT DOCUMENTS

EP 2 570 370 3/2013

*Primary Examiner* — Kaitlin S Joerger
(74) *Attorney, Agent, or Firm* — Gudrun E. Huckett

(57) ABSTRACT

A store for storing parcels has a main aisle and storage aisles arranged transversely to the main aisle and provided with storage places for the parcels. Beams arranged parallel to the main aisle and fastened to supports bear at least some of the weight forces acting in the storage aisles. A transport unit for transporting parcels is arranged in the main aisle. The transport unit has a first transport mechanism moving along the main aisle and a second transport mechanism that transfers parcels from the transport unit into a storage aisle, takes up parcels from a storage aisle and delivers them to the transport unit. The second transport mechanism has a slide movable transversely to the main aisle. The slide forms a rest for parcels during transfer and take-up. A tiltable platform that supports the slide is provided with a tilt mechanism that tilts the platform relative to the transport unit.

19 Claims, 3 Drawing Sheets

(56) References Cited

U.S. PATENT DOCUMENTS

| | | | |
|---|---|---|---|
| 2014/0072392 A1* | 3/2014 | Tanahashi | B65G 1/0421 414/277 |
| 2014/0212250 A1* | 7/2014 | Wolter | G07F 11/1657 414/281 |
| 2015/0158670 A1* | 6/2015 | Kainuma | B66B 7/047 414/277 |
| 2016/0090284 A1* | 3/2016 | Svensson | B66F 9/0755 701/50 |
| 2020/0216261 A1* | 7/2020 | Frederiks | B65G 1/0435 |

* cited by examiner

STORE FOR THE SINGLE-LOCATION STORAGE OF PARCELLED GOODS

BACKGROUND OF THE INVENTION

The invention relates to a store for the storage of parceled goods, comprising a main aisle and comprising storage aisles arranged transversely to the main aisle and comprising a plurality of storage places for receiving a respective parcel. Beams are arranged parallel to the main aisle and bear at least a part of the weight forces at play in the storage aisles; the beams are fastened to supports and extend between these fastenings. In the main aisle, a transport unit for transporting the parceled goods is arranged, wherein the transport unit has a first transport mechanism for movement along the main aisle and a second transport mechanism for transferring a parcel from the transport unit into one of the storage aisles and for taking up a parcel from one of the storage aisles and delivering it to the transport unit. A slide, which is movable transversely to the main aisle, is a constituent part of the second transport mechanism and forms a rest for the parcel during the transfer and take-up thereof.

EP 2 570 370 A1 discloses a system for the storage and delivery of transport units, in which transport units are storable in a plurality of rack levels of a rack. The transport units stored in the rack can be fed to a lift and delivered by means of the lift to a delivery region. The lift is configured as a paternoster lift comprising a plurality of lift cages for transport units. In addition, a plurality of lifts can be provided for a plurality of modules, wherein at least one of these lifts is arranged for transport of the transport units in a main aisle.

Stores are usually multi-storey structures, which are comprised of main aisles and secondary aisles. Such stores are often erected in steel skeleton construction. The supporting structure is composed of a framework comprised of a multiplicity of steel supports and, fastened between these, steel beams; the supports and beams are connected to one another, for instance, by bolts or rivets. In steel skeleton structures, deformations of the supporting structure arise already due to the intrinsic weight of the steel components. As a result of additional application-specific structures fastened to the supports and/or beams, such as, for example, rail systems for transport units of a storage system, additional weight loads come to bear and further increase the deformations of the framework. The supports here already deflect from their vertical orientation. Above all, the intervening, substantially horizontal or obliquely arranged beams sag.

The object of the present invention resides in improving a store for the storage of parceled goods such that deformations of the supporting structure of vertical supports and horizontal beams fastened thereto are taken into account such that a reliable storage and retrieval of the parceled goods is nevertheless possible.

SUMMARY OF THE INVENTION

This object is achieved for a store of the aforementioned kind in accordance with the invention in that the slide is supported in the transport unit on a tiltable platform comprising a tilt mechanism, and wherein the tilt mechanism is configured to tilt the platform relative to the transport unit. Preferred or advantageous embodiments of the invention are disclosed in the dependent claims.

The store for the storage of parceled goods according to the invention comprises a transport unit comprising a slide which is supported in the transport unit on a tiltable platform comprising a tilt mechanism, wherein the tilt mechanism is configured to tilt the platform relative to the transport unit.

The transport unit is movable along the main aisle, wherein the parcel arranged thereon is secured on the platform. A predetermined storage place for the parcel, which storage place can lie in any chosen storage aisle, is then headed for, and the platform, with the slide arranged thereon and the parcel, is firstly positioned before or opposite the predetermined storage aisle.

Due to the intrinsic weights of the beams arranged in the region of the respective storage aisle and the loads acting on the supporting structure, in particular due to parceled goods already stored in the storage aisle, the beam has a sag. Sag should be understood to mean an orthogonal offset in the deformed position of the beam in comparison to a non-deformed, exactly horizontal position of the beam. The offset is, inter alia, dependent on the material, on the load, and on the stiffness of the beam. In other words, the respective beam has a slight curvature in comparison to the horizontal, and the tilt mechanism arranged on the platform is configured to align the platform with the existing curvature of the beam. Thus, by means of the tilt mechanism, the inclination of the platform is adaptable to the current extent of the respective beam.

On the platform and in the storage aisles, tracks for the slide are provided; the tracks, by positioning and tilting of the platform relative to the beam, are adjusted in alignment with one another. By this adjustment, it is possible to make both a transfer of the parcel from the platform of the transport unit into the respective storage aisle and a reverse take-up of the parcel from the respective storage aisle and delivery back onto the platform of the transport unit reliable and uniform. In particular, a cant or bumping of the slide, which would lead to a vibration of the load or parcel, and to high wear on the involved components, is prevented.

According to a first illustrative embodiment, the tilt mechanism comprises a first and a second final control element, which, for the tilting of the platform, are separately adjustable. The final control elements can thus both be adjusted, or alternatively individually adjusted. The final control elements can in particular be actuated pneumatically or hydraulically in order to adjust a height of a respective side of the platform on which the respective final control element is arranged, and hence, at the same time, the inclination of the platform relative to the transport unit.

Preferably, the final control elements are arranged beneath the platform and support the platform against a lifting mechanism, or against a lifting ramp which is a constituent part of the transport unit. The final control elements can here extend substantially along the entire length of the respective side of the platform.

In addition, it is conceivable that the tilt mechanism comprises more than two final control elements in order to thus enable a tilting of the platform in three-dimensional space. The final control elements can here be arranged at the corners of the platform, for example at all four corners.

According to a second illustrative embodiment, the tilt mechanism has a pivoting device comprising a pivot axis extending transversely to the direction of the main aisle. Preferably, the pivoting device is arranged with the pivot axis centrally under the platform. Consequently, the platform is configured as a rocker and is mounted articulately about the pivot axis. By actuation of the pivoting device, the two sides of the platform which are arranged transversely to the main aisle are adjusted for height oppositely to each other. To put it another way, a side of the platform that is oriented parallel to the pivot axis is raised by the pivoting device at the same time as the opposite side of the platform is lowered.

Preferably, means for registering a current extent of a beam and for controlling the tilt mechanism are arranged on the transport unit. The means for registering the current extent of the beam can comprise one or more sensor units comprising sensor elements which, on the basis of different measuring methods, directly or indirectly register the extent of the beam, that is to say the position of the beam in space, and transmit a measurement value characterizing the extent of the beam to a control apparatus of the transport unit. In other words, an actual extent of the beam is determined.

It is further preferred that means for registering a current inclination of the platform are arranged on the transport unit. The means for registering the current inclination of the platform can likewise comprise one or more sensor units comprising sensor elements, which, for data transfer purposes, are connected to the control apparatus. The measurement values transmitted by the means for registering the current extent of the beam are reconciled by the control apparatus with measurement values characterizing the current inclination or extent of the platform. In other words, the actual inclination of the platform is determined.

The control apparatus is set up to control the tilt mechanism in such a way that the current actual inclination of the platform is approximated to a desired inclination of the platform that corresponds to the actual extent of the beam. In this way, the platform is oriented substantially in alignment with the beam by a tilting of the platform initiated by the tilt mechanism.

Additionally, it is preferred that the transport unit is movable on a rail system, comprised of a first rail and a second rail, in the main aisle. Alternatively, the transport unit can also be moved along the main aisle on wheels or rollers. Preferably, an appropriate position sensor system is connected to the control apparatus in order to determine the position of the transport unit relative to the storage aisles.

Preferably, the slide is mounted on the platform via a plurality of wheels. On each side of the slide that runs transversely to the main aisle, at least two wheels are embodied on the slide. They are embodied and mounted on the slide such that a reliable and uniform transfer and take-up of the slide between the platform and the storage aisle is possible.

The invention includes the technical teaching that the wheels are guided in guide rails, which are a constituent part of the platform. To put it another way, the slide is displaceable, guided in the longitudinal direction by the guide rails, and is secured in the transverse direction.

Preferably, the wheels are guided along crossbeams arranged in the storage aisle. Roller tracks for the wheels and rests for the parceled goods are embodied on the crossbeams. When orienting the platform of the transport unit in relation to the beam of the storage aisle, the guide rails of the platform are oriented substantially in alignment with the roller tracks on the crossbeams of the storage aisle so that the slide is movable from the platform into the storage aisle, or vice versa, without hindrance, i.e. without the wheels of the slide having to bridge height differences.

Additionally, it is preferred that the slide has a height-adjustable rest surface for receiving the parcel. Preferably, the guide rails of the platform and the crossbeams of the storage aisles are of substantially Z-shaped configuration. To put it another way, the guide rails and the crossbeams have a first base surface for connection to the platform or for connection to the respective beam and a second base surface for supporting the parcel on the guide rail or on the crossbeam. The two base surfaces are integrally connected via a crosspiece configured substantially perpendicular thereto.

The slide is designed, in relation to the guide rails and crossbeams, such that the rest surface for the vertical movement of the respective parcel can be raised in order to receive the parcel from the guide rails or the crossbeams. In other words, the slide bears the intrinsic weight of the parcel during the transport. Once the slide has reached the storage place provided for the respective parcel, the rest surface is lowered so that the parcel comes to bear against the second base surface of the respective crossbeam. Analogously thereto, the rest surface of the slide, once a defined position has been reached, is likewise lowered so as to deposit the parcel on the second base surface of the respective guide rail, for onward transport by means of the transport unit.

BRIEF DESCRIPTION OF THE DRAWINGS

Further details and advantages emerge from the following description of two illustrative embodiments represented in the Figures.

FIG. 1b shows a schematic side view of the store according to FIG. 1a.

DESCRIPTION OF PREFERRED EMBODIMENTS

Figure 1A:
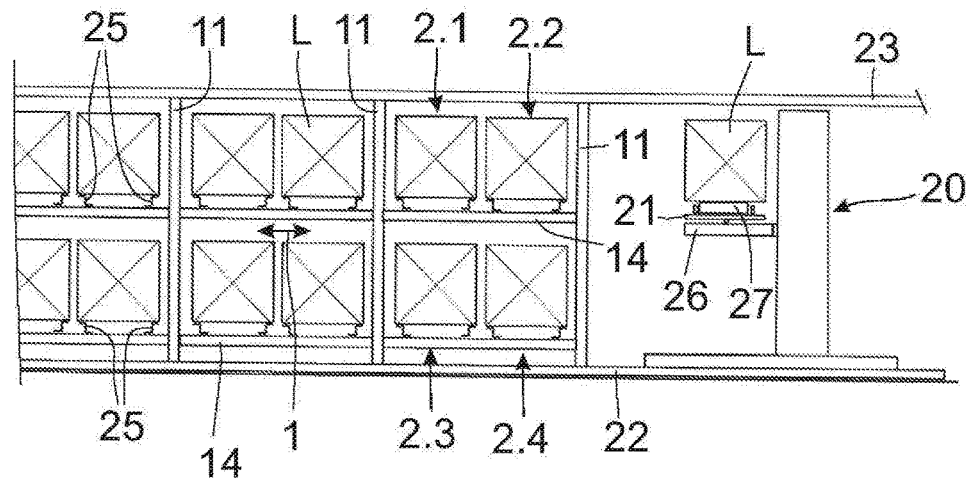
FIG. 1a shows a schematic view of a store comprising a transport unit according to a first embodiment.
Figure 1B:
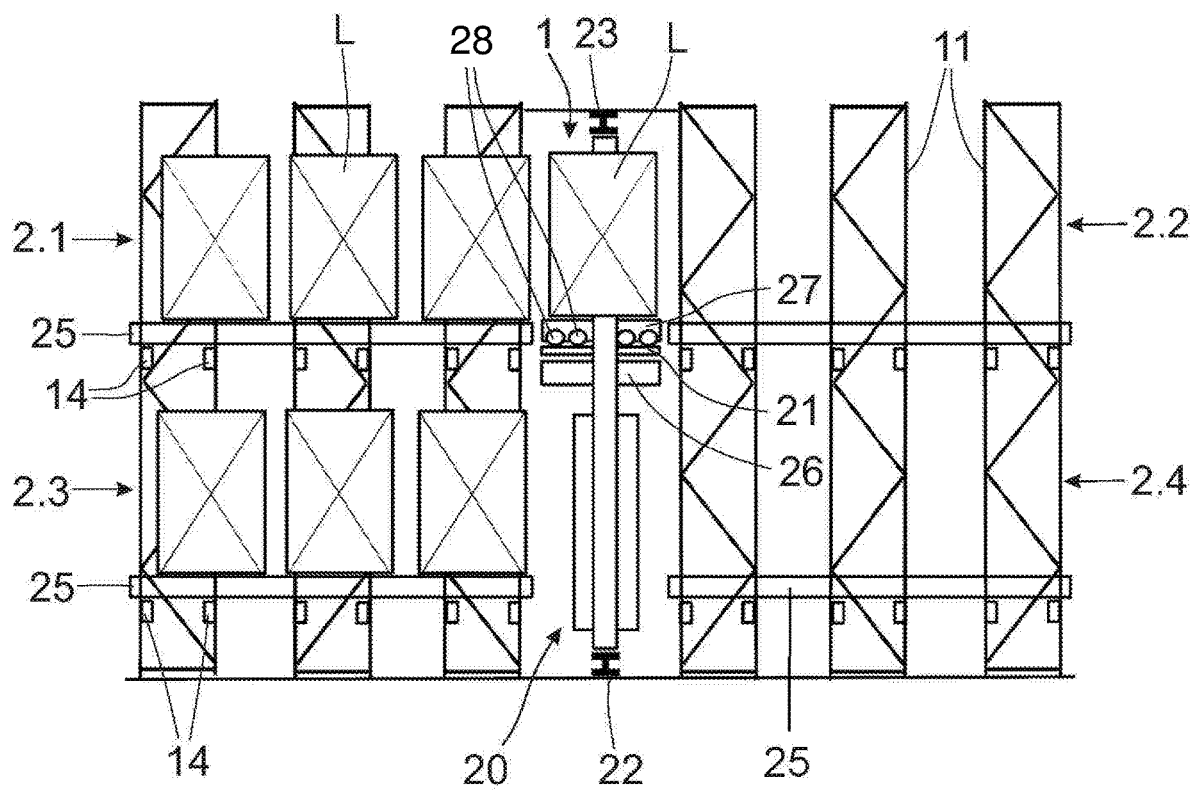

In FIGS. 1a and 1b, a multi-storey store for the storage of parceled goods L is represented. The store comprises a main aisle 1 and a plurality of storage aisles 2.1-2.4 arranged transversely to the main aisle 1 and comprising respectively a plurality of storage places, arranged in a line one behind another, for respectively receiving a parcel L.

Parallel to the main aisle 1, horizontal beams 14 are arranged which bear at least a part of the weight forces at play in the storage aisles 2.1-2.4. The horizontal beams 14 are fastened to vertical supports 11 and extend between these fastenings. In addition, horizontal crossbeams 25 arranged transversely to the main aisle 1 and parallel to the storage aisles 2.1-2.4 are arranged to support the mounted parceled goods L. The crossbeams 25 are, for example, supported and fastened on the beams 14 and form at the top the rests for the parceled goods.

A transport unit 20 for the transport of the parceled goods L is arranged in the main aisle 1. The transport unit 20 has a first transport mechanism for moving the transport unit 20 along the main aisle 1. To this end, the transport unit 20 is movable along the main aisle 1 on a rail system comprised of a first rail 22 and a second rail 23.

The transport unit 20 further has a second transport mechanism for transferring a respective parcel L from the transport unit 20 into one of the storage aisles 2.1-2.4 and for taking up a parcel L from one of the storage aisles 2.1-2.4 and delivering it onto the transport unit 20.

The second transport mechanism comprises a slide 27 which is movable transversely to the main aisle 1 into the storage aisles and is guided on wheels and which has a rest for the parcel L during the transfer and take-up thereof.

Figure 2A:
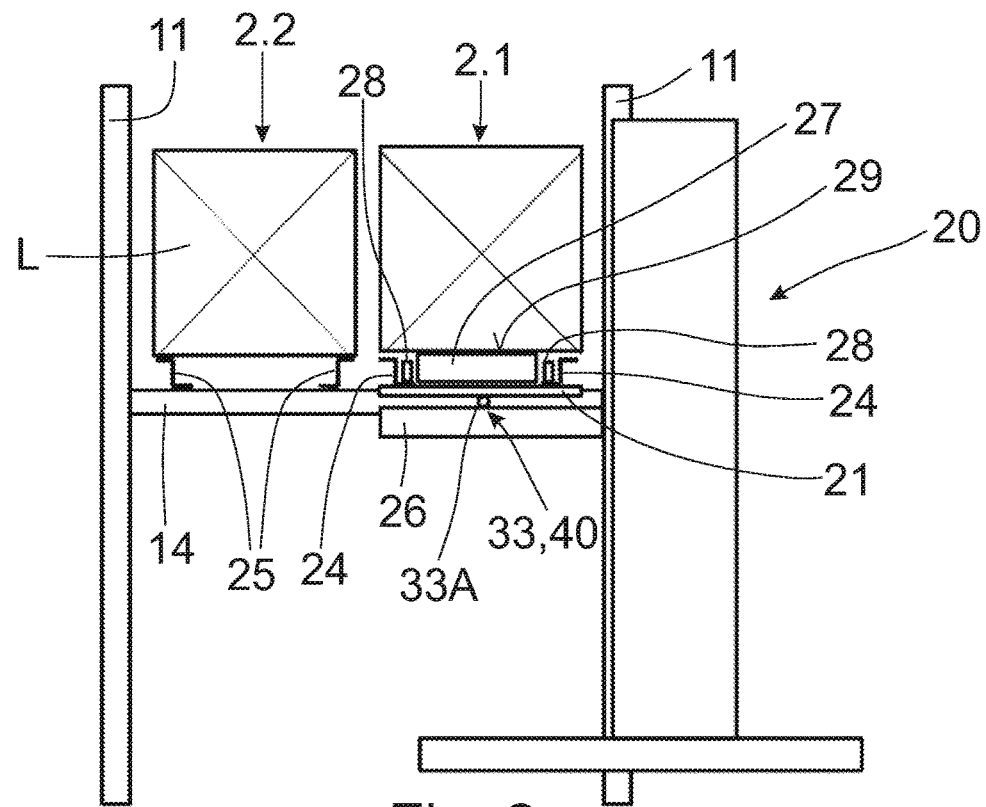
FIG. 2a shows a simplified view of the transport unit of the store according to FIGS. 1a and 1b, wherein a platform of the transport unit is in a non-inclined state.
Figure 2B:
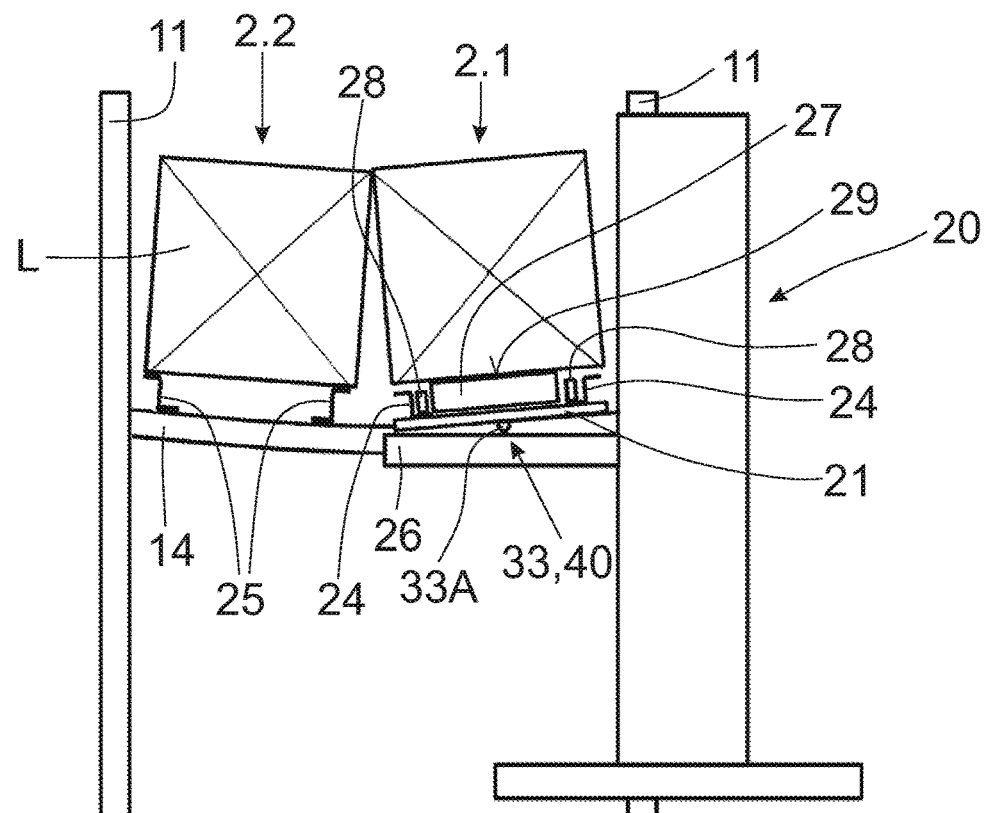
FIG. 2b shows a view of the transport unit of the store according to FIG. 2a, wherein the platform is in an inclined state.
Figure 3:
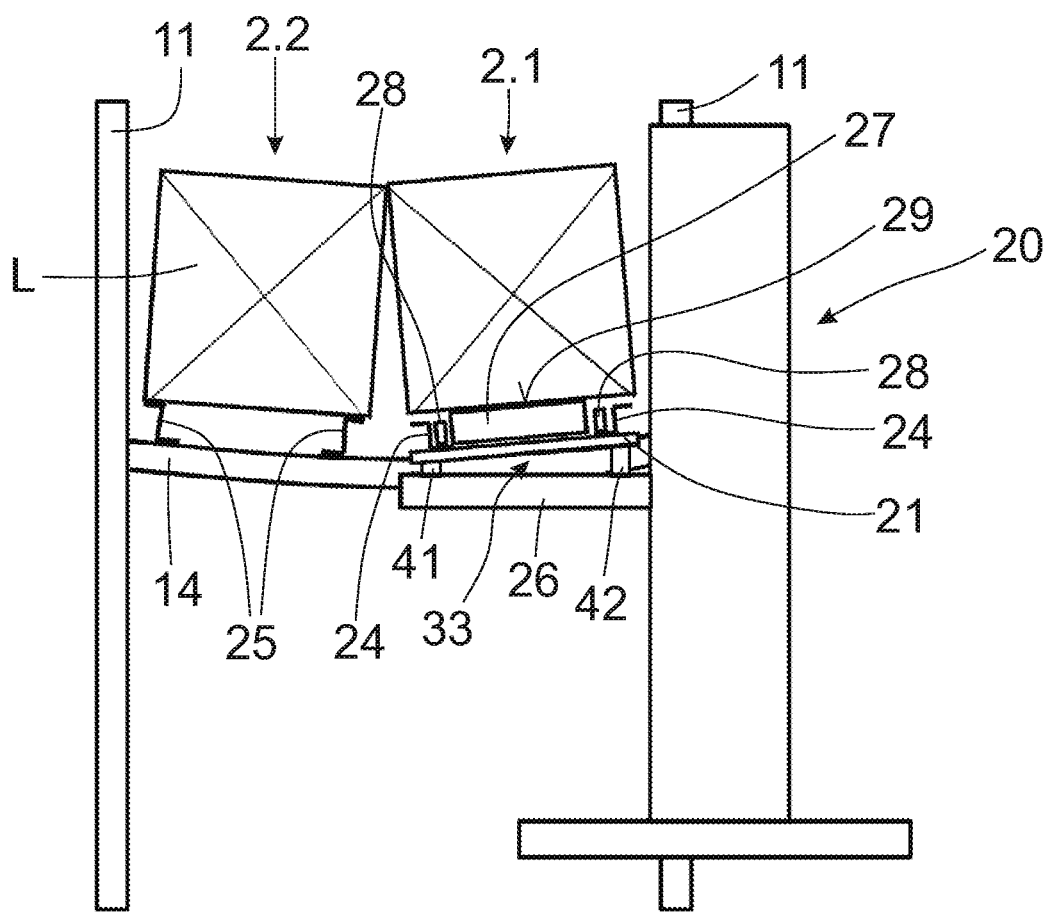
FIG. 3 shows a simplified view of the transport unit of the store according to a second embodiment, wherein the platform of the transport unit is in an inclined state.

According to FIGS. 2a, 2b, and 3, the wheeled slide 27 is supported on a tiltable platform 21 of the transport unit 20. The platform 21 is operatively connected to a tilt mechanism 33. The tilt mechanism 33 is in turn supported on a height-adjustable lifting ramp 26 of the transport unit 20 and is configured to tilt the platform 21 relative to the transport unit 20 and to the lifting ramp 26. Via the lifting ramp 26, the height of the platform 21 is adjustable relative to the respective storage aisle 2.1-2.4.

The slide 27 is guidable via a plurality of wheels 28 in rolling transport on the platform 21, wherein the wheels 28 are guided in two parallel arranged guide rails 24 which run transversely to the main aisle 1 and are a constituent part of the platform 21. The slide 27 has a height-adjustable rest surface 29 for receiving the parcel L, by which the parcel L can be raised from the guide rails 24 and the crossbeams 25.

For the transfer of the parcel L to the respectively selected storage aisle 2.1, the slide 27 is rolled transversely in the main aisle 1 into the storage aisle 2.1. The slide 27 is here initially guided on the guide rails 24 of the platform 21 and, upon the transfer of the parcel L, is guided on the crossbeams 25 arranged along the storage aisle 2.1. For this purpose, the crossbeams 25 are respectively in part configured as rails which serve as roller tracks.

By the tilt mechanism 33, the guide rails 24 of the platform 21, prior to the transfer or prior to the take-up of the parcel L, are arranged in alignment with the rails embodied on the crossbeams 25, so that an unhindered transfer or take-up of the slide 27 is possible without any danger of impacts or vibrations on the slide, and hence on the parcel L.

On the transport unit 20, means for registering the current extent (inclination) of the respective horizontal beam 14 and means for controlling the tilt mechanism 33 are arranged. In addition, means for registering a current inclination of the platform 21 are provided. The registration of the current extent (inclination) of the respective beam 14 and of the current inclination of the platform 21 is realized by means of a sensor system (not represented here), which, for data transfer purposes, is connected to a control apparatus (likewise not shown). This control apparatus can be connected to a drive unit (not shown), which drives and controls the tilt mechanism 33.

In FIGS. 2a and 2b, a first embodiment of the transport unit 20, and in particular of the second transport mechanism, is shown in simplified representation. FIG. 2a shows an ideal case of the store, in which the vertical supports 11, the horizontal beams 14, and the rails on the horizontal crossbeams 25 display no deformation. In this case, no tilting of the platform 21 is necessary for the transfer or take-up of the parcel.

In reality, the supports 11, the beams 14, and the railed crossbeams 25 do, however, display deformations, wherein in particular the beams 14 sag, as represented in exaggeration in FIG. 2b. The further the vertical supports 11 are spaced apart and the greater the loads acting on the beams 14 are, the greater is the sagging of the beam 14. To the beam 14 represented by way of example in FIG. 2a, four crossbeams 25, two crossbeams 25 of the first storage aisle 2.1, and two crossbeams 25 of the second storage aisle 2.2 are connected in the present case, wherein on the crossbeams 25 parceled goods L are already arranged, which already produce a sagging of the beam 14 before the parcel L arranged on the platform 21 is transferred into the storage aisle 2.1.

In FIGS. 2a and 2b, the tilt mechanism 33 of the second transport mechanism has a pivoting device 40 comprising a pivot axis 33A extending transversely to the direction of the main aisle 1. The pivoting device 40 is arranged centrally under the platform 21 and between the lifting ramp 26 and the platform 21.

According to FIG. 2b, prior to the transfer of the parcel L into the storage aisle 2.1 the platform is positioned in the region before the storage aisle 2.1, wherein the means for registering the current extent of the beam 14 register a curvature of the beam 14. In addition, by the means for registering the current inclination of the platform 21, the inclination of the platform 21 relative to the beam 14 and to the transport unit 20 is detected.

By means of the pivoting device 40 of the tilt mechanism 33, the platform 21 is subsequently inclined such that the guide rails 24 of the platform 21 are oriented substantially in alignment with the rails—here concealed for reasons of perspective—on the crossbeams 25 of the storage aisle 2.1. To put it another way, the guide rails 24 and the crossbeams 25 respectively have a roller track for the wheels 28 of the slide 27, wherein the height of the roller track on the guide rails 24 is adapted to the height of the roller track on the crossbeams 25. As a result, the following transfer of the slide 27 with the parcel L arranged thereon is realized without hindrance so that the wheels 28 of the slide 27 do not have to overcome any differences in height between the guide rails 24 and the rails, arranged in alignment therewith, on the crossbeams 25.

A delivery of the parcel L back onto the platform is realized analogously, wherein the tilt mechanism 33 firstly orients the platform 21 with the guide rails 24 relative to the beam 14 with the respective crossbeams 25, before the slide 27 is then moved out of the respective storage aisle 2.1-2.4 onto the platform. The tilt mechanism 33 can here be regulated and controlled by the control apparatus such that the position of the platform 21, in particular the height and inclination thereof, is maintained by the parcel L and/or the slide 27 even in the event of sudden or uniform changes in load.

In FIG. 3, a second embodiment of the transport unit 20, and in particular of the second transport mechanism, is shown in simplified representation. The difference to the transport unit 20 according to FIGS. 1a to 2b resides in the tilt mechanism 33 comprising no fixed pivot axis, but rather a first and a second final control element 41, 42, which, for the tilting of the platform 21, are adjustable separately from each other. The final control elements 41, 42 are respectively arranged in the region of one of the two sides of the platform 21 which are arranged parallel to the storage aisle 2.1-2.4, and between the platform 21 and the lifting ramp 26 of the transport unit 20.

Upon transfer or take-up of the parcel L, the final control elements 41, 41 of the tilt mechanism 33 are actuated with due regard to the registered measurement values of the current extent of the beam 14 and for the current inclination of the platform 21 by the control apparatus in order to orient the guide rails 24 of the platform 21 by tilting the platform 21 substantially in alignment with the rails on the crossbeams 25 of the respective storage aisle 2.1-2.4.

The specification incorporates by reference the entire disclosure of German priority document 10 2019 100 420.9 having a filing date of 9 Jan. 2019.

While specific embodiments of the invention have been shown and described in detail to illustrate the inventive principles, it will be understood that the invention may be embodied otherwise without departing from such principles.

LIST OF REFERENCE CHARACTERS 1 main aisle
2.1 storage aisle
2.2 storage aisle
2.3 storage aisle
2.4 storage aisle
11 support
14 beam
20 transport unit
21 platform
22 rail for the transport unit
23 rail for the transport unit
24 guide rail of the platform
25 crossbeam
26 lifting ramp
27 slide
28 wheel
29 rest surface
33 tilt mechanism
33A pivot axis
40 pivoting device
41 final control element
42 final control element
L parcel

What is claimed is:

1. A store for the storage of parcels (L), the store comprising:
a main aisle (1) and storage aisles (2.1-2.4) arranged transversely to the main aisle (1) and comprising a plurality of storage places configured to receive a respective parcel (L);
beams (14), arranged parallel to the main aisle (1) and bearing at least a part of weight forces acting in the storage aisles (2.1-2.4), the beams (14) fastened to supports (11) and extending between the supports (11);
a transport unit (20), arranged in the main aisle (1), configured to transport the parcels (L), wherein the transport unit (20) comprises
a first transport mechanism configured to move along the main aisle (1),
a second transport mechanism configured to transfer a parcel (L) from the transport unit (20) into one of the storage aisles (2.1-2.4) and to take up a parcel (L) from one of the storage aisles (2.1-2.4) and deliver the parcel (L) to the transport unit (20), wherein the second transport mechanism comprises a slide (27) movable transversely to the main aisle (1), the slide (27) forming a rest for the parcel (L) during transfer and take-up thereof,
a tiltable platform (21) comprising a tilt mechanism (33), wherein the tilt mechanism (33) is configured to tilt the platform (21) relative to the transport unit (20), wherein the slide (27) is supported on the tiltable platform (21);
means, arranged on the transport unit (20), for registering a current extent of a beam (14) and for controlling the tilt mechanism (33).

2. The store according to claim 1, wherein the tilt mechanism (33) comprises a first final control element (41) and a second final control element (42) which are adjustable separately from each other for tilting the platform (21).

3. The store according to claim 1, wherein the tilt mechanism (33) comprises a pivoting device (40) comprising a pivot axis (33A) extending transversely to a direction of the main aisle (1).

4. The store according to claim 3, wherein the pivoting device (40) is arranged under the platform (21) and the pivot axis (33A) is arranged centrally relative to the platform (21).

5. The store according to claim 1, further comprising means, arranged on the transport unit (20), for registering a current inclination of the platform (21).

6. The store according to claim 1, wherein the transport unit (20) is movable on a rail system comprised of a first rail (22) and a second rail (22), wherein the first and second rails (22,23) are arranged in the main aisle (1).

7. The store according to claim 1, wherein the slide (27) comprises a plurality of wheels (28) and is mounted on the platform (21) so as to be movable by the plurality of wheels on the platform (21).

8. The store according to claim 7, wherein the platform (21) comprises guide rails (24) configured to guide the plurality of wheels.

9. The store according to claim 7, wherein the plurality of wheels (28) are guided along crossbeams (25) arranged in the storage aisle (2.1-2.4), wherein roller tracks for the plurality of wheels (28) and rests for the parcels (2) are provided on the crossbeams (25).

10. The store according to claim 1, wherein the slide (27) has a height-adjustable rest surface (29) for receiving the parcel (L).

11. A store for the storage of parcels (L), the store comprising:
a main aisle (1) and storage aisles (2.1-2.4) arranged transversely to the main aisle (1) and comprising a plurality of storage places configured to receive a respective parcel (L);
beams (14), arranged parallel to the main aisle (1) and bearing at least a part of weight forces acting in the storage aisles (2.1-2.4), the beams (14) fastened to supports (11) and extending between the supports (11);
a transport unit (20), arranged in the main aisle (1), configured to transport the parcels (L), wherein the transport unit (20) comprises
a first transport mechanism configured to move along the main aisle (1),
a second transport mechanism configured to transfer a parcel (L) from the transport unit (20) into one of the storage aisles (2.1-2.4) and to take up a parcel (L) from one of the storage aisles (2.1-2.4) and deliver the parcel (L) to the transport unit (20), wherein the second transport mechanism comprises a slide (27) movable transversely to the main aisle (1), the slide (27) forming a rest for the parcel (L) during transfer and take-up thereof,
a tiltable platform (21) comprising a tilt mechanism (33), wherein the tilt mechanism (33) is configured to tilt the platform (21) relative to the transport unit (20), wherein the slide (27) is supported on the tiltable platform (21);
means, arranged on the transport unit (20), for registering a current inclination of the platform (21).

12. The store according to claim 11, wherein the tilt mechanism (33) comprises a first final control element (41) and a second final control element (42) which are adjustable separately from each other for tilting the platform (21).

13. The store according to claim 11, wherein the tilt mechanism (33) comprises a pivoting device (40) comprising a pivot axis (33A) extending transversely to a direction of the main aisle (1).

14. The store according to claim 13, wherein the pivoting device (40) is arranged under the platform (21) and the pivot axis (33A) is arranged centrally relative to the platform (21).

15. The store according to claim 11, wherein the transport unit (20) is movable on a rail system comprised of a first rail (22) and a second rail (22), wherein the first and second rails (22,23) are arranged in the main aisle (1).

16. The store according to claim 11, wherein the slide (27) comprises a plurality of wheels (28) and is mounted on the platform (21) so as to be movable by the plurality of wheels on the platform (21).

17. The store according to claim 16, wherein the platform (21) comprises guide rails (24) configured to guide the plurality of wheels.

18. The store according to claim 16, wherein the plurality of wheels (28) are guided along crossbeams (25) arranged in the storage aisle (2.1-2.4), wherein roller tracks for the plurality of wheels (28) and rests for the parcels (2) are provided on the crossbeams (25).

19. The store according to claim 11, wherein the slide (27) has a height-adjustable rest surface (29) for receiving the parcel (L).

\* \* \* \* \*